United States Patent [19]

Hochberger

[11] Patent Number: 5,533,295

[45] Date of Patent: Jul. 9, 1996

[54] FISHING POLE HOLDER

[76] Inventor: Daniel Hochberger, 123 School St., Rehoboth, Mass. 02769

[21] Appl. No.: 308,370

[22] Filed: Sep. 19, 1994

[51] Int. Cl.$^6$ ..................................................... A01K 97/10
[52] U.S. Cl. ........................... 43/21.2; 248/512; 248/533
[58] Field of Search .............................. 43/21.2; 248/512, 248/513, 514, 515, 528, 529, 533

[56] References Cited

U.S. PATENT DOCUMENTS

| | | | |
|---|---|---|---|
| 2,438,388 | 3/1948 | Dolk | 248/533 |
| 2,713,741 | 7/1955 | Gnagy | 43/21.2 |
| 2,881,996 | 8/1956 | Matchette, Jr. | |
| 3,186,666 | 6/1965 | Williams | 43/21.2 |
| 3,546,805 | 12/1970 | Schaeffer | 43/21.2 |
| 4,043,070 | 8/1977 | Lamothe | 43/21.2 |
| 4,485,579 | 12/1984 | Hawie | |
| 4,550,520 | 11/1985 | Bogue | 43/21.2 |
| 4,603,500 | 8/1986 | Harrison, Sr. | |
| 4,650,146 | 3/1987 | Duke | |
| 4,763,435 | 8/1988 | Deering | 43/21.2 |
| 4,854,069 | 8/1989 | Smith | 43/21.2 |
| 4,871,099 | 10/1989 | Bogar, Jr. | |
| 5,063,701 | 11/1991 | Ottens | 43/21.2 |
| 5,245,780 | 9/1993 | Hansen | 43/21.2 |
| 5,400,996 | 3/1995 | Drish | 248/514 |

*Primary Examiner*—Kurt Rowan
*Attorney, Agent, or Firm*—Salter & Michaelson

[57] ABSTRACT

A fishing pole holder of the type capable of holding at least one fishing pole in a generally upright position includes a pair of outer legs each having a lower portion adapted to engage a surface and an upper portion constructed and arranged for holding a fishing pole. An inner leg, positioned between the outer legs, has a lower portion adapted to engage the surface. A connector connects the outer and inner legs, the connector being constructed and arranged for enabling the inner leg to rotate between a stowed position in which the inner leg is generally parallel to the outer legs and an operable position in which the outer legs are generally inclined with respect to a horizontal plane and the inner leg is oppositely inclined with respect to the outer legs for stabilizing the outer legs in an upright position suitable for holding a fishing pole. A combination fishing pole holder and angler pack is also disclosed and includes a shoulder harness for releasably attaching the holder, when in its stowed position, around the shoulders of a wearer, and a belt for releasably attaching the holder, when in its stowed position, around the waist of a wearer.

19 Claims, 4 Drawing Sheets

5,533,295

FISHING POLE HOLDER

SUMMARY OF THE INVENTION

This invention relates generally to fishing pole holders, and more particularly to a fishing pole holder especially suited for surf casting. The fishing pole holder is movable between a stowed position for transporting and storing the holder and an operable position in which the holder is in a generally upright position suitable for holding a fishing pole. The fishing pole holder is also capable of being converted to an angler pack in which it may be easily transported by being worn on the back of a wearer.

The present invention is in the same general field as U.S. Pat. No. 4,650,146 to Duke. This patent discloses a fishing pole holder having a telescoping rod or stand that is driven into sand and a pair of fishing pole receptacles which are attached by brackets to an upper end of the stand. The holder is fabricated from aluminum and requires extensive machining and welding to construct it. There is presently a need for a surf fishing pole holder fabricated from materials which do not require extensive machining or welding and which is easily assembled. There is also presently a need for a fishing pole holder which is capable of assuming an operable position for surf fishing and a stowed position for transporting and storing it.

Among the several objects of the present invention are the provision of a fishing pole holder which is constructed of tubular material (e.g., polyvinylchloride) which does not require extensive machining or any welding in order to construct and assemble it; the provision of such a fishing pole holder which is movable between a stowed position for transporting and storing the holder and an operable position in which the holder is in a generally upright position suitable for holding a fishing pole; the provision of such a fishing pole holder which is sturdy in its operable position; the provision of such a fishing pole holder capable of being converted to an angler pack in which it may be easily transported by being worn on the back of a wearer; and the provision of such a fishing pole holder which is simple in design and easy to use.

In general, the invention is directed to a fishing pole holder of the type capable of holding at least one fishing pole in a generally upright position. The holder comprises a first leg having a lower portion adapted to engage a surface and an upper portion constructed and arranged for holding a fishing pole, a second leg having a lower portion adapted to engage the surface, and a connector for connecting the first and second legs. The connector is constructed and arranged for enabling the second leg to rotate between a stowed position in which the second leg is generally parallel to the first leg and an operable position in which the first leg is generally inclined with respect to a horizontal plane and the second leg is oppositely inclined with respect to the first leg for stabilizing the first leg in an upright position suitable for holding a fishing pole.

In another aspect of the present invention, the holder comprises a third leg having a lower portion for engaging the surface. The third leg is spaced apart from and substantially parallel to the first leg. The first and third legs constitute a pair of outer legs, and the second leg is positioned between the first and third legs and constitutes an inner leg.

In a third aspect of the present invention, a combination fishing pole holder and angler pack comprises a fishing pole holder, a shoulder harness for releasably attaching the holder, when in its stowed position, around the shoulders of a wearer, and a belt for releasably attaching the holder, when in its stowed position, around the waist of a wearer.

Other objects, features and advantages of the invention shall become apparent as the description thereof proceeds when considered in connection with the accompanying illustrative drawings.

BRIEF DESCRIPTION OF THE DRAWINGS

Corresponding references designate corresponding parts throughout the several views of the drawings.

DETAILED DESCRIPTION OF THE PREFERRED EMBODIMENT

Figure 1:
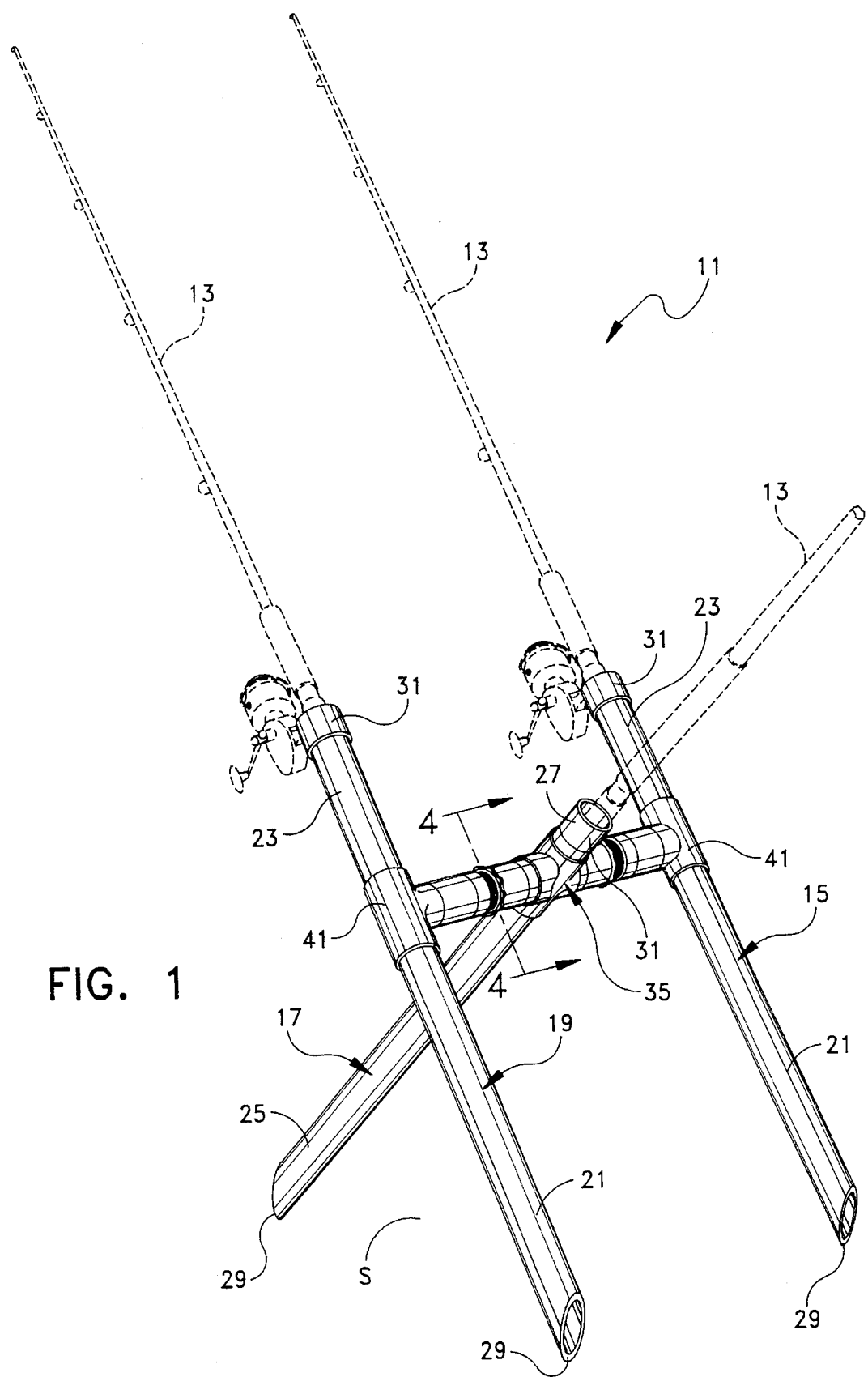
FIG. 1 is a perspective view of a fishing pole holder of the present invention, the holder being shown in an operable position.

Referring to the drawings, and more particularly to FIGS. 1–4, there is generally indicated at 11 a fishing pole holder of the present invention capable of holding three fishing poles 13 (illustrated in phantom in FIG. 1) of conventional construction. The fishing pole holder 11 comprises a first leg generally indicated at 15, a second leg generally indicated at 17 and a third leg generally indicated at 19. The first and third legs 15, 19 constitute a pair of outer legs and the second leg 17, positioned between the outer legs, constitutes an inner leg. As shown in Fig.1, the spaced apart outer legs 15, 19 are substantially parallel to each other while the inner leg 17 is at an angle with respect to the outer legs. The outer and inner legs 15 and 19 are each approximately three feet long and have about a 1 ½ to 2 inch diameter.

Each outer leg 15, 19 has a lower portion 21 that is adapted to engage a surface S, such as sand, and an upper portion 23 that is constructed for receiving the handle or butt end of the fishing pole 13 therein. The inner leg 17 is similarly constructed as the outer legs 15, 19 in that it has a lower portion 25 that is adapted to engage the surface S and an upper portion 27 constructed for receiving the handle or butt end of the fishing pole 13 therein. The outer legs 15, 19 and the inner leg 17 are preferably fabricated from rigid tubular material, such as polyvinylchloride ("PVC"). Each lower portion 21, 25 of the outer legs 15, 19 and the inner leg 17 is formed with a pointed tip 29 that is quite common in the presently known spike that is used for securing the legs of the fishing pole holder in sand while surf fishing. The upper portions 23, 27 of the legs 15, 19 are each provided with a tubular extension or collar 31 for receiving therein the butt end of the fishing pole 13 as illustrated in FIG. 1.

Figure 3:
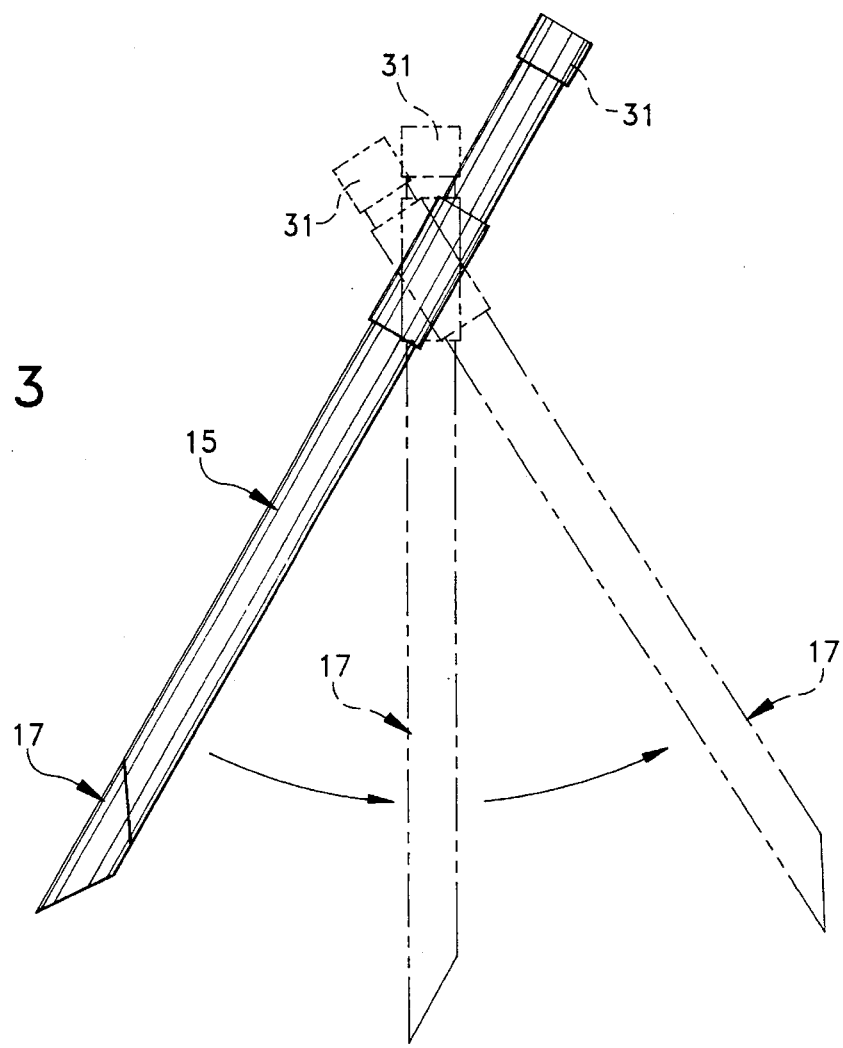
FIG. 3 is a side elevation view of the holder that is illustrated in solid lines in its stowed or non-use position, the movement of an inner leg of the holder being illustrated in phantom.

A connector generally indicated at 35 connects the outer and inner legs 15, 17 and 19 in a manner such that the outer legs 15, 19 maintain their substantially parallel relationship, while the inner leg 17 is capable of rotating between a stowed position (solid lines of FIG. 3) and an operable position (phantom lines of FIG. 3). In its stowed position, the inner leg 17 of the holder 11 extends in a direction generally parallel to the outer legs 15, 19 and lies along substantially the same plane as the outer legs. This position makes it easy to carry and transport the holder 11 (e.g., in an automobile's trunk) since it is relatively flat. As best shown in FIG. 3, the lower portion 25 of the inner leg 17 extends below the lower portions 21 of the outer legs 15, 19 while the upper portions 23 of the outer legs 15, 19 extend above the upper portion 27 of the inner leg 17. The tubular extension 31 of the inner leg 17 constitutes an upper extension which extends upwardly beyond the inner leg's point of attachment to the connector 35. The upper extension is suited for hanging objects, such as a lamp (not shown), therefrom.

Figure 4:
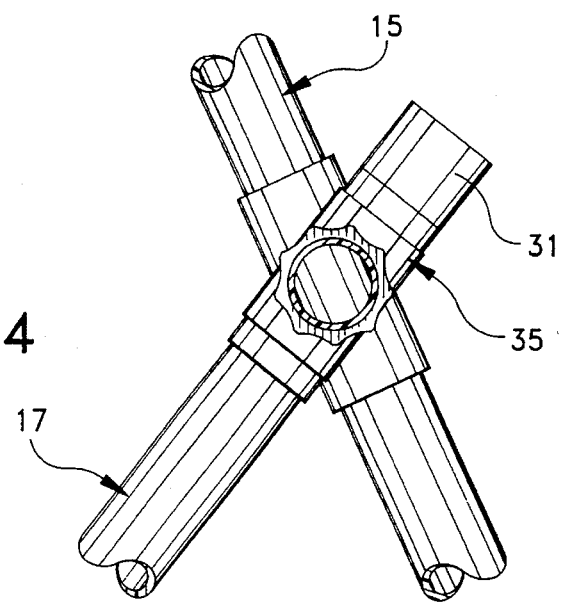
FIG. 4 is a cross-sectional view of the holder taken along lines 4—4 of FIG. 1.

In its operable position, the outer legs 15, 19 are generally inclined with respect to a horizontal plane (e.g., approximately 45 degrees as illustrated in FIG. 1) and the inner leg 17 is generally oppositely inclined with respect to the outer legs. Depending upon the stability and slope of the ground on which the holder 11 is secured, the angle formed between the outer legs 15, 19 and the inner leg 17 is about 90 degrees or less (i.e., acute). As illustrated in FIG. 4, the angle between the outer legs 15, 19 and the inner leg 17 is approximately 70 degrees. The inner leg 17 is capable of rotating to any suitable angle with respect to the outer legs 15, 19 for securing the holder in sand.

Figure 2:
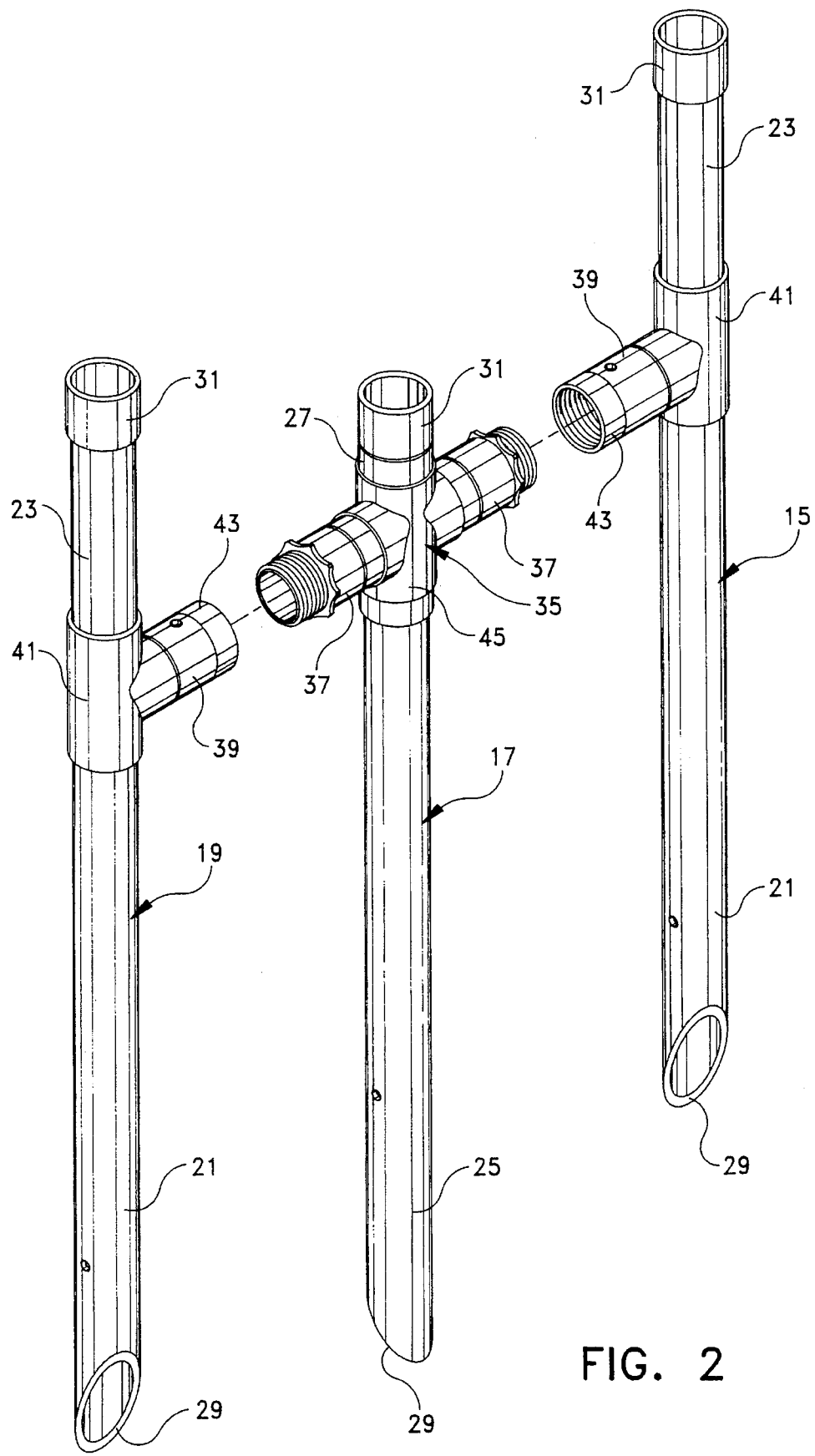
FIG. 2 is an exploded perspective view of the holder.

As illustrated in FIG. 2, the connector 35 is preferably fabricated from PVC tubing and is generally cross-shaped. The connector 35 comprises a pair of opposite, horizontally disposed neck portions 37 which releasably mate with neck portions 39 provided along the outer legs 15, 19 for securing the outer legs to the connector. The neck portions 39 of the outer legs 15, 19 are each part of a T-shaped connector 41 which slides onto the outer leg and is secured thereto by a suitable adhesive or cement. Each horizontal neck portion 37 of the connector 35 is externally threaded and is received within a collar 43 of a respective outer leg neck portion 39. The collar 43 has an internally threaded bore which receives the horizontal neck portion 37 of the connector 35. The outer legs 15, 19, are attached to the connector 35 by threadably fastening respective neck portions 37 of the connector 35 to respective neck portions 39 of the outer legs.

The connector 35 also comprises a pair of opposite, vertically aligned tubular portions 45 which receive therein and fixedly attach the inner leg 17 to the connector. The inner leg 17 is received within the tubular portions 45 of the connector and secured thereto by any suitable means such as adhesive or cement. The inner leg 17 is locked into its operable or stowed positions by tightening the connections (i.e., collars 43) between the outer legs 15, 19 and the connector 35. The angle between the inner leg 17 and the outer legs 15, 19 may be changed by loosening the connections between the outer legs and the connector 35, rotating the inner leg to a desired angle and tightening the connections.

It should be noted that the fishing pole holder 11 is specifically designed to be easily assembled. The holder 11 is constructed from parts which are readily available, i.e., approximately nine feet of PVC tubing, a cross-shaped connector and two T-shaped connectors. The parts are assembled by using adhesive to secure the connector 35 to the inner leg 17 and the T-shaped connectors 41 to respective outer legs 15, 19. In use, the inner leg 17 is locked in its operable position and the outer legs 15, 19 and inner leg 17 are driven into the sands. In this position, fishing poles 13 may be inserted into the tubular extensions 31 of the outer legs 15, 19 and a spare fishing pole 13 into the tubular extension of the inner leg 17. The fishing pole holder 11 is sturdy since the two outer legs 15, 19 provide lateral stability and the inner leg 17 prevents the holder from moving towards the water in response to a strike by a fish.

Figure 5:
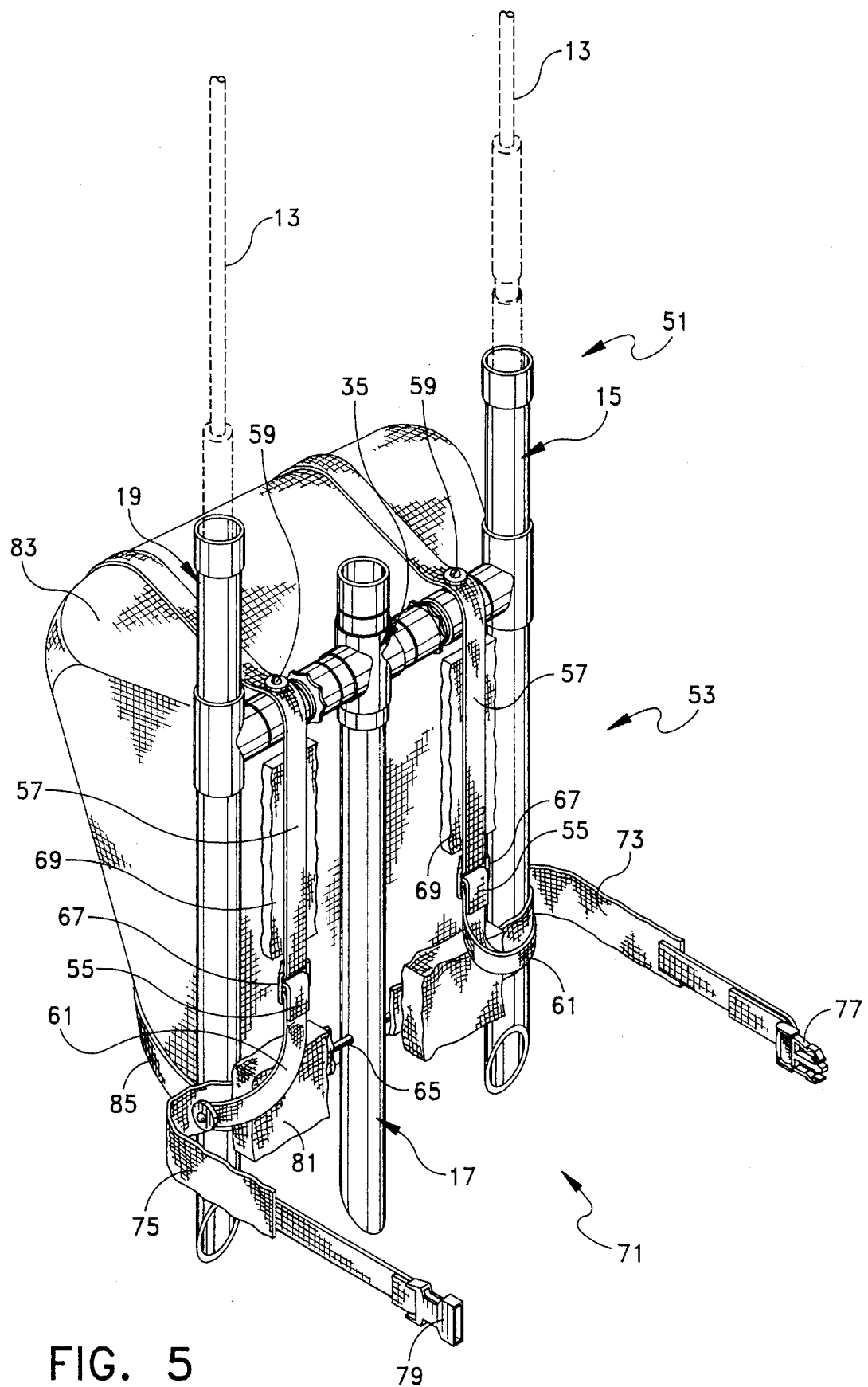
FIG. 5 is a perspective view of a fishing pole holder of a second embodiment which is capable of being used as an angler pack.

FIG. 5 illustrates a fishing pole holder generally indicated 51, identical to the one illustrated in FIGS. 1–4, but modified to function as an angler pack to be worn on the back of a wearer as well as to function as a fishing pole holder. A shoulder harness, generally designated 53, releasably attaches the holder 55, when in its stowed position, around the shoulders of the wearer. The shoulder harness 53 includes a pair of shoulder straps (e.g., nylon straps) each indicated at 55, one shoulder strap 55 being attached to outer leg 15 and the other shoulder strap being attached to outer leg 19. Each shoulder strap 55 is adjustable in length to fit the particular body shape of the wearer and has a top end leash 57 attached at its upper end to the neck portion 39 of the outer leg 15, 19 by a pin 59 which extends through an opening (FIG. 2) provided in the neck portion 39, and a bottom end leash 61 attached at its lower end to the lower portion 21 of the outer leg 15, 19 by a pin 65. Lock washers 65 (not shown) are secured to the free ends of the pins 59 to lock them in place. Pin 65 extends through aligned openings (FIG. 2) provided in the outer and inner legs 15, 19 and receives a lock washer (not shown) on its outer end to secure the holder 51 in its stowed position. The free end of each top leash 57 has a buckle 67 which receives the free end of its respective bottom leash 61 for securing and tightening the strap 55 about the shoulder of the wearer. For each strap 55, a cushion 69 is disposed underneath the top leash 57 for cushioning the strap when it engages the shoulder of the wearer.

A belt, generally designated 71, releasably attaches the holder 51, when in its stowed position, around the waist of the wearer. The belt 71 comprises a first belt strap 73 extending from outer leg 15 and a second belt strap 75 extending from outer leg 19. The first belt strap 73 is attached by the pin 65 to the lower end portion 21 of outer leg 15 and extends outwardly to a free end. Likewise, the second belt strap 75 is attached by the pin 65 to the lower end portion 21 of outer leg 19 and extends outwardly to a free end. Fastening means comprising a two part fastener having a male fastener 77 attached to strap 73 and a female fastener attached to strap 75 releasably fastens the first and second belt straps 73, 75 together. The belt 71 is capable of being cinched in order to tighten it around the waist of the wearer. As illustrated in FIG. 5, the first and second straps 73, 75 are part of one continuous strap which extends between the outer legs 15, 19 adjacent pin 65, however, it is to be understood that two separate straps could be used as well. A pad 81, located at the lower end of the holder 51, is provided for engaging the wearer's back at the waist and for protecting the wearer's back from the rigid outer and inner legs 15, 17 and 19 and the pin 65.

Still referring to the holder 51 illustrated in FIG. 5, a bag 83 having a compartment for storing items within the bag is releasably attachable to the holder 51 when the holder is in its stowed position. The bag 83 is attached to the holder by straps (integral with the top leashes 57 of the shoulder straps 55) which are held to the holder 51 by pins 59. Another strap 85 attaches the bottom of the bag 83 to the lower portions 21 of the outer legs 15, 19 by pin 65. The bag 83 is specifically suited for carrying items used for fishing, for example clothing, fishing lures, line and bait.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fishing pole holder capable of holding at least one fishing pole in a generally upright and supported position, said holder comprising:

a first leg having a lower portion adapted to engage a surface and an upper portion having means for holding a fishing pole in a position in which the fishing pole is completely supported by said leg above said surface;

a second leg having an upper portion and a lower portion adapted to engage said surface; and a connector for connecting said first and second legs to one another below their upper portions, said connector being constructed and arranged for enabling said second leg to rotate between a stowed position in which said second leg is generally parallel to said first leg and an operable position in which said first leg is generally inclined with respect to a horizontal plane and said second leg is oppositely inclined with respect to said first leg for stabilizing the first leg in an upright position suitable for holding a fishing pole.

2. The fishing pole holder as set forth in claim 1 further comprising a third leg having an upper portion and a lower portion for engaging said surface, said third leg being spaced apart from and substantially parallel to said first leg.

3. The fishing pole holder as set forth in claim 2 wherein said upper portion of the third leg has means for holding a fishing pole in a position in which the fishing pole is completely supported above said surface.

4. The fishing pole holder as set forth in claim 3 wherein said first and third legs constitute a pair of outer legs, and wherein said second leg is positioned between the first and third legs and constitutes an inner leg.

5. The fishing pole holder as set forth in claim 4 wherein said connector is adapted to maintain said outer legs in their substantially parallel relationship while enabling said inner leg to rotate between its said stowed and operable positions.

6. The fishing pole holder as set forth in claim 4 wherein said outer legs and said inner leg are made from rigid tubing, said means of the upper portions of the outer legs each comprising a tubular extension for receiving a butt end of a fishing pole.

7. The fishing pole holder as set forth in claim 4 wherein said inner leg is fixedly attached to said connector.

8. The fishing pole holder as set forth in claim 7 wherein said inner leg has an upper extension which extends upwardly beyond its point of attachment to said connector, said upper extension of the inner leg being suitable for hanging objects therefrom.

9. The fishing pole holder as set forth in claim 4 wherein said connector is generally cross-shaped, said connector comprising a pair of opposite, horizontally disposed neck portions which are adapted to mate with respective neck portions provided along the outer legs for securing the outer legs to the connector.

10. The fishing pole holder as set forth in claim 9 wherein each horizontally disposed neck portion of the connector and each neck portion of the outer legs are threaded for releasable attachment of the connector with the outer legs.

11. The fishing pole holder as set forth in claim 9 wherein said connector further comprises a pair of opposite, vertically disposed tubular portions which are adapted to receive therein said inner leg.

12. A fishing pole holder capable of holding at least one fishing pole in a generally upright and supported position, said holder comprising:

a pair of laterally spaced apart outer legs, each leg having a lower portion adapted to engage a surface, at least one of the legs having an upper portion having means for holding a fishing pole in a position in which the fishing pole is completely supported by said leg above said surface;

an inner leg having an upper portion and a lower portion adapted to engage said surface, said inner leg being positioned between said outer legs; and a connector for connecting the outer legs and the inner leg to one another below their upper portions, said connector being adapted to maintain said outer legs in a substantially parallel relationship while enabling said inner leg to rotate between a stowed position in which the inner leg is generally parallel to said outer legs and an operable position in which said outer legs are generally inclined with respect to a horizontal plane and said inner leg is generally oppositely inclined with respect to said outer legs for stabilizing the holder in an upright condition suitable for holding a fishing pole.

13. A combination fishing pole holder and angler pack comprising:

a fishing pole holder comprising
      a pair of outer legs each having a lower portion adapted to engage a surface, at least one of said outer legs having an upper portion constructed and arranged for holding a fishing pole, an inner leg having a lower portion adapted to engage said surface, and a connector for connecting said outer and inner legs, said connector being constructed and arranged for enabling said inner leg to rotate between a stowed position in which said inner leg is generally parallel with said outer legs and an operable position in which said outer legs are generally inclined with respect to a vertical plane and said inner leg is oppositely inclined with respect to the outer legs for stabilizing said outer legs in an upright condition suitable for holding a fishing pole; a shoulder harness for releasably attaching said holder, when in its stowed position, around the shoulders of a wearer; and a belt for releasably attaching said holder, when in its stowed positions around the waist of a wearer.

14. The combination as set forth in claim 13 wherein said shoulder harness comprises a pair of shoulder straps, one of the shoulder straps being attached to one of the outer legs of the holder and the other shoulder strap being attached to the other outer legs.

15. The combination as set forth in claim 14 wherein each shoulder strap is adjustable in length and has a top end attached to an upper portion of its respective outer leg and a bottom end attached to a lower portion of its respective outer leg.

16. The combination as set forth in claim 15 wherein each shoulder strap includes a cushion disposed underneath the shoulder strap.

17. The combination as set forth in claim 13 wherein said belt comprises a first belt strap extending from one of said outer legs of the holder at the wearer's waist and terminating at a free end, a second belt strap extending from the other of said outer legs of the holder at the wearer's waist and terminating at a free end, and connector means for releasably connecting the free ends of the straps.

18. The combination as set forth in claim 17 wherein said belt further comprises a pad for engaging the wearer's back at the waist.

19. The combination as set forth in claim 13 further comprising a bag having a compartment for storing items therein, said bag being releasably attachable to the holder when the holder is in its stowed position and removed from the holder when the holder is in its operable position.

* * * * *